M. O. REEVES.
SLIP COMPARING DEMONSTRATOR.
APPLICATION FILED JUNE 29, 1916.

1,242,863.

Patented Oct. 9, 1917.
2 SHEETS—SHEET 1.

WITNESSES:
Frank A. Sable
Josephine Gasper

INVENTOR
Milton O. Reeves,

BY
Hood & Schley
ATTORNEYS

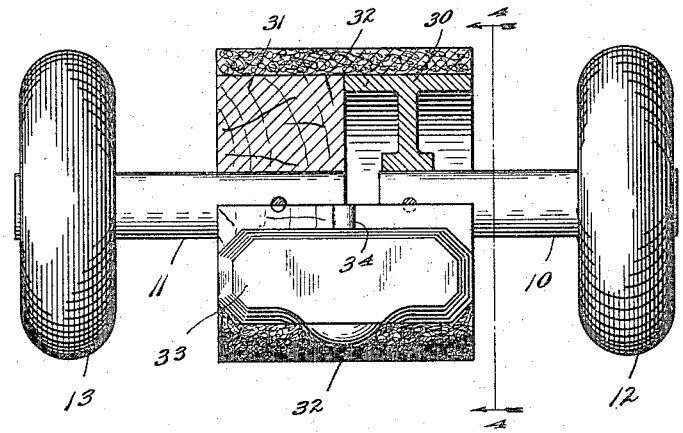
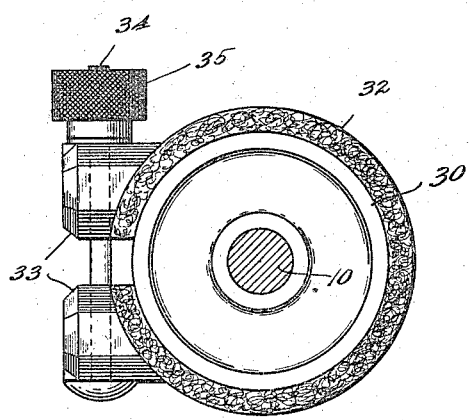

UNITED STATES PATENT OFFICE.

MILTON O. REEVES, OF COLUMBUS, INDIANA, ASSIGNOR TO REEVES PULLEY COMPANY, OF COLUMBUS, INDIANA, A CORPORATION OF INDIANA.

SLIP-COMPARING DEMONSTRATOR.

1,242,863.    Specification of Letters Patent.    Patented Oct. 9, 1917.

Application filed June 29, 1916. Serial No. 106,612.

*To all whom it may concern:*

Be it known that I, MILTON O. REEVES, a citizen of the United States, residing at Columbus, in the county of Bartholomew and State of Indiana, have invented a new and useful Slip-Comparing Demonstrator, of which the following is a specification.

It is the object of my invention to provide a demonstrating device for use by salesmen and others to compare and contrast the ability to hold against slipping of different materials, and especially to compare and contrast the ability of different materials to hold against slipping when clamped on a shaft and of pulleys of different materials to hold a belt from slipping.

Figure 1:
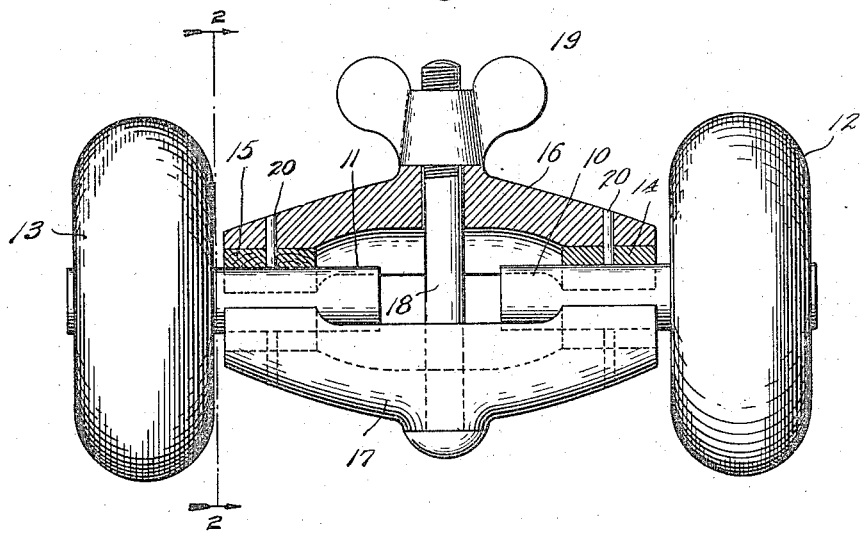
Figure 2:
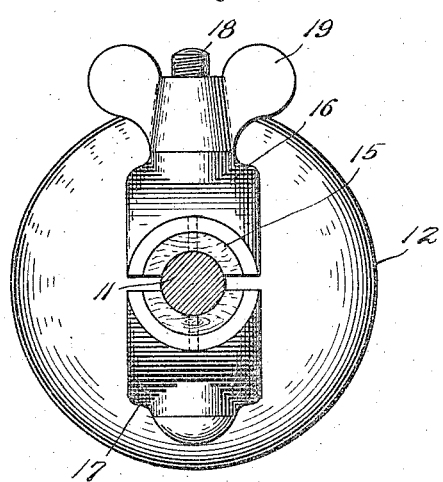

The accompanying drawings illustrate my invention. In these drawings, Figure 1 is a front elevation, partially in section, of a slip-comparing demonstrator embodying my invention, for comparing the liability to slip of different materials clamped on a shaft; Fig. 2 is a section on the line 2—2 of Fig. 1; Fig. 3 is a view similar to Fig. 1, showing a slip-comparing demonstrator for comparing the liability to slip of a belt on pulleys of different materials; and Fig. 4 is a section on the line 4—4 of Fig. 3.

In the slip-comparing demonstrator shown in Figs. 1 and 2, two shaft sections 10 and 11 of the same diameter are in alinement with each other, and at their remote ends are provided with operating handles or wheels 12 and 13 respectively. The adjacent ends of the two shaft sections are mounted in pairs of half bushings 14 and 15 carried in the opposite ends of two opposing clamping plates 16 and 17, which may be forced toward each other with any desired force by a connecting bolt 18 provided with a wing nut 19. The bolt 18 is located midway between the bushings 14 and 15, so that by tightening the wing nut 19 equal forces are exerted on the bushings 14 and 15, and thereby on their coöperating shaft sections 10 and 11. The half bushings 14 and 15 are conveniently held against turning in the clamping plates 16 and 17 by pins 20.

The half bushings 14 are made of one and the half bushings 15 of the other of the materials to be compared and contrasted in regard to their liability to slip on the material of the shaft sections. For instance, if it is desired to compare and contrast the relative tendencies to slip of wood and cast iron pulleys on a steel shaft, the shaft sections 10 and 11 are made of steel, the half bushings 14 of cast iron, and the half bushings 15 of wood. When the parts have been assembled, the wing nut 19 is tightened to any desired extent, and the demonstrator grasps the two operating handles 12 and 13 in his two hands and twists them. The same twisting stress is thus exerted between the shaft section 10 and the half bushings 14 and between the shaft section 11 and the half bushings 15, and when sufficient twisting force is used one or the other of these shaft sections slips in its bushing. The one which slips is, of course, the one in the bushing of the material having the greater tendency to slip on the material of the shaft. In actual practice, with wood and cast iron bushings, the shaft section in the cast iron bushings is always the one to slip, for any degree of tightening of the wing nut 19 whatsoever. This is useful in demonstrating that cast iron pulleys have a greater tendency to slip on their supporting shafts than have wood pulleys.

The demonstration may be made even more effective by interchanging the shaft sections, or the bushings, or both, with relation to the ends of the clamping plates 16 and 17, so as to show clearly the equality of pressure at both ends and the uniformity of the resistance to slip under all these conditions. The shaft section in the cast iron bushing always slips first.

In the slip-comparing demonstrator shown in Figs. 3 and 4, there are the two shaft sections 10 and 11 provided with operating handles or wheels 12 and 13 respectively, as before, but the adjacent ends of the shaft sections 10 and 11 have fixed thereon small pulleys 30 and 31 respectively, of equal size. A leather band 32, representing a belt, extends around these pulleys, being of sufficient width to cover both pulleys. The ends of the leather band 32 are provided with clamping bars 33, which are connected at their middle points by a clamping bolt 34 provided with a tightening nut 35. By tightening the nut 35, the leather band is clamped with equal forces upon the peripheries of the two pulleys 30 and 31, the force being varied by adjusting the tightening nut 35.

To compare the tendencies of a belt to slip on pulleys of different materials, the pulleys 30 and 31 are made of the two materials which it is desired to compare and contrast. The operator grasps the two operating handles 12 and 13 in his two hands and twists them as before. This produces a twisting stress between each pulley 30 and 31 and the leather band surrounding it; and the stress is the same on the two pulleys. When sufficient twisting force is exerted, one or the other of the pulleys slips within the leather band 32, the one which slips being of course the one of the material on which a belt slips the more easily. For instance, if the pulleys 30 and 31 are made of wood and steel or iron respectively, the steel or iron pulley always slips, leaving the wood pulley relatively fixed within the leather band 32. This is the case for any degree of tightening of the tightening nut 35. This is useful in demonstrating that a belt has less tendency to slip on a wood pulley than on an iron or steel pulley. As in the demonstrator shown in Figs. 1 and 2, the parts may be interchanged in position to show clearly the equality of pressure developed and the uniformity of the resistance to slip under all conditions.

I claim as my invention:

1. A slip-comparing demonstrating instrument, comprising two relatively rotatable members of the same size, and a clamp in opposite ends of which said rotatable members are held, the respective rotatable members and the clamp frictionally interengaging on surfaces of different materials of which the relative tendencies to slip are to be compared.

2. A slip-comparing demonstrating instrument, comprising two relatively rotatable members, and a clamp in opposite ends of which said rotatable members are held, the respective rotatable members and the clamp frictionally interengaging on surfaces of different materials of which the relative tendencies to slip are to be compared.

3. A slip-comparing demonstrating instrument, comprising two relatively rotatable members of the same size, and a clamp in which said rotatable members are held, the respective rotatable members and the clamp frictionally interengaging on surfaces of different materials of which the relative tendencies to slip are to be compared.

4. A slip-comparing demonstrating instrument, comprising two relatively rotatable members, and a clamp in which said rotatable members are held, the respective rotatable members and the clamp frictionally interengaging on surfaces of different materials of which the relative tendencies to slip are to be compared.

5. A slip-comparing demonstrating instrument, comprising two relatively rotatable members, a clamp in which said rotatable members are held, the respective rotatable members and the clamp frictionally interengaging on surfaces of different materials of which the relative tendencies to slip are to be compared, and means for adjusting the pressure of said clamp on said rotatable members.

6. A slip-comparing demonstrating instrument, comprising two relatively rotatable members, and a clamp in which said rotatable members are held, the respective rotatable members and the clamp frictionally interengaging on surfaces of different materials of which the relative tendencies to slip are to be compared, and said clamp acting with substantially equal force on said two rotatable members.

7. A slip-comparing demonstrating instrument, comprising two relatively rotatable members, a clamp in which said rotatable members are held, the respective rotatable members and the clamp frictionally interengaging on surfaces of different materials of which the relative tendencies to slip are to be compared, and a tightening device for adjustably tightening said clamp, said tightening device acting on said clamp at a point substantially equidistant from the two rotatable members.

8. A slip-comparing demonstrating instrument, comprising two alined relatively rotatable members, and a clamp in which said rotatable members are held, the respective rotatable members and the clamp frictionally interengaging on surfaces of different materials of which the relative tendencies to slip are to be compared.

9. A slip-comparing demonstrating instrument, comprising two alined relatively rotatable members, a clamp in which said rotatable members are held, the respective rotatable members and the clamp frictionally interengaging on surfaces of different materials of which the relative tendencies to slip are to be compared, and a tightening device for adjustably tightening said clamp, said tightening device acting on said clamp at a point substantially equidistant from the two rotatable members.

In witness whereof, I have hereunto set my hand at Columbus, Indiana, this 26th day of June, A. D. one thousand nine hundred and sixteen.

MILTON O. REEVES.